United States Patent [19]

Arledge et al.

[11] Patent Number: 5,436,744
[45] Date of Patent: Jul. 25, 1995

[54] FLEXIBLE LIQUID CRYSTAL DISPLAY WITH INTEGRATED DRIVER CIRCUIT AND DISPLAY ELECTRODES FORMED ON OPPOSITE SIDES OF FOLDED SUBSTRATE

[75] Inventors: John K. Arledge, Lauderhill; Thomas J. Swirbel, Davie, both of Fla.

[73] Assignee: Motorola Inc., Schaumburg, Ill.

[21] Appl. No.: 115,625

[22] Filed: Sep. 3, 1993

[51] Int. Cl.⁶ ................ G02F 1/1333; G02F 1/1345
[52] U.S. Cl. ....................................... 359/82; 359/88; 359/74
[58] Field of Search ................ 359/82, 87, 88, 74, 359/83, 81, 89

[56] References Cited

U.S. PATENT DOCUMENTS

| | | |
|---|---|---|
| 4,297,004 | 10/1981 | Nishimura et al. ............ 359/88 |
| 4,431,270 | 2/1984 | Funade et al. ............... 359/88 |
| 4,474,432 | 10/1984 | Takamatsu et al. .......... 359/82 |
| 4,597,635 | 7/1986 | Hoshikawa .................. 359/82 |
| 4,699,470 | 10/1987 | McLaughlin et al. ........ 359/82 |
| 4,789,858 | 2/1988 | Fergason et al. ............ 359/88 |
| 4,806,922 | 2/1989 | McLaughlin et al. ........ 359/88 |
| 4,808,990 | 2/1989 | Kamigaki et al. ........... 340/784 |
| 4,862,153 | 8/1989 | Nakatani et al. ............ 359/82 |
| 5,029,984 | 7/1991 | Adachi et al. .............. 359/88 |
| 5,161,009 | 11/1992 | Tanoi et al. ................. 359/82 |
| 5,220,183 | 6/1993 | Taniguchi et al. ........... 359/87 |
| 5,341,233 | 8/1994 | Tomoike et al. ............. 359/88 |

Primary Examiner—William L. Sikes
Assistant Examiner—Tai V. Duong
Attorney, Agent, or Firm—Dale W. Dorinski

[57] ABSTRACT

A liquid crystal display (LCD) package (10) is made by creating an indium/tin oxide electrode (64) on the surface of a flexible substrate (60). The electrode is connected to conductive vias (68) in the flexible substrate by conductive runners (66) that are also indium/tin oxide with an overlayer of copper. The indium/tin oxide is typically sputtered, and the copper is sputtered or plated on selected portions of the runners. The conductive vias are further connected to a circuitry pattern (62) on an opposite side of the flexible substrate. A display driver (70) is attached to the circuitry pattern to drive the LCD (5). A second substrate (80), also with a film electrode (82) on it, is arranged in mutually opposing planar relationship to the flexible substrate in order to form a liquid crystal display. A liquid crystal material (86) is then filled in the gap between the two substrates creating an LCD module (10). The LCD module can be folded about a portion (72) of the flexible substrate so that the display driver circuit is directly underneath the film electrode. An adhesive bonding agent (77) is used to retain the flexible substrate in the folded position.

4 Claims, 7 Drawing Sheets

FLEXIBLE LIQUID CRYSTAL DISPLAY WITH INTEGRATED DRIVER CIRCUIT AND DISPLAY ELECTRODES FORMED ON OPPOSITE SIDES OF FOLDED SUBSTRATE

TECHNICAL FIELD

This invention relates in general to a liquid crystal display device and more particularly, to a liquid crystal display device which integrally combines the liquid crystal element and the circuitry for driving the liquid crystal element.

BACKGROUND

Electronic devices that use liquid crystal displays (LCD) have been steadily expanding in popularity. As a consequence, the need to produce LCDs having reduced weight and thickness is widely recognized. Typical LCDs use glass substrates with transparent electrodes and a liquid crystal material placed in a gap between the electrodes. Sophisticated driving circuitry is necessary in order to energize selected segments of the LCD to create the desired image. The drive circuitry is typically an integrated circuit or microprocessor.

The problem of connecting the drive circuitry to the LCD has created a number of solutions in the literature. A typical configuration is shown in FIG. 1 where an LCD 5 is coupled to a printed circuit board 20 that has a driver circuit 30 attached thereto. The driver circuit 30 is coupled to the LCD 5 by conductive elastomers 40 that are sandwiched between the LCD and the printed circuit board. A clamping means 50, typically clips, brackets or screws, is used to apply compressive force to the LCD 5 and the printed circuit board 20 in order to clamp the entire structure together. It can be clearly seen from the drawings that this type of structure is quite complex and very thick, thereby limiting its use in applications where thin and light products are required.

FIG. 2 shows another approach utilized in the prior art where the LCD 5 is coupled to the drive circuitry 30 by a flexible circuit 22. Electrical connection between the flex circuit and the LCD is made by an intermediate flexible coupling or by a conductive adhesive 24.

It is clear that prior art approaches to coupling the driver circuitry to the LCD leaves much to be desired. It would be highly advantageous if an LCD package could be made that results in an LCD with lower profile and smaller area that is also less complex to assemble than conventional systems.

SUMMARY OF THE INVENTION

Briefly, according to the invention, there is provided a liquid crystal display module. The liquid crystal display (LCD) is made by creating a film electrode on the surface of a flexible substrate. The film electrode is connected to conductive vias in the flexible substrate by conductive runners. The vias are further connected to a circuitry pattern on an opposite side of the flexible substrate. A display driver is attached to the circuitry pattern to drive the LCD. A second substrate, having a film electrode on it, is arranged in mutually opposing planar relationship to the flexible substrate in order to form a liquid crystal display. A liquid crystal material is then filled in the gap between the two substrates creating an LCD module.

In another embodiment of the invention, the LCD module is folded about a portion of the flexible substrate so that the display driver circuit is directly underneath the film electrode. A bonding agent, such as an adhesive, may be used to retain the flexible substrate in the folded position.

In a further embodiment of the invention, the electrodes are indium/tin oxide and the conductive runners connecting the electrodes to the vias are layers of copper over the indium/tin oxide.

DETAILED DESCRIPTION OF THE PREFERRED EMBODIMENT

Figure 1:
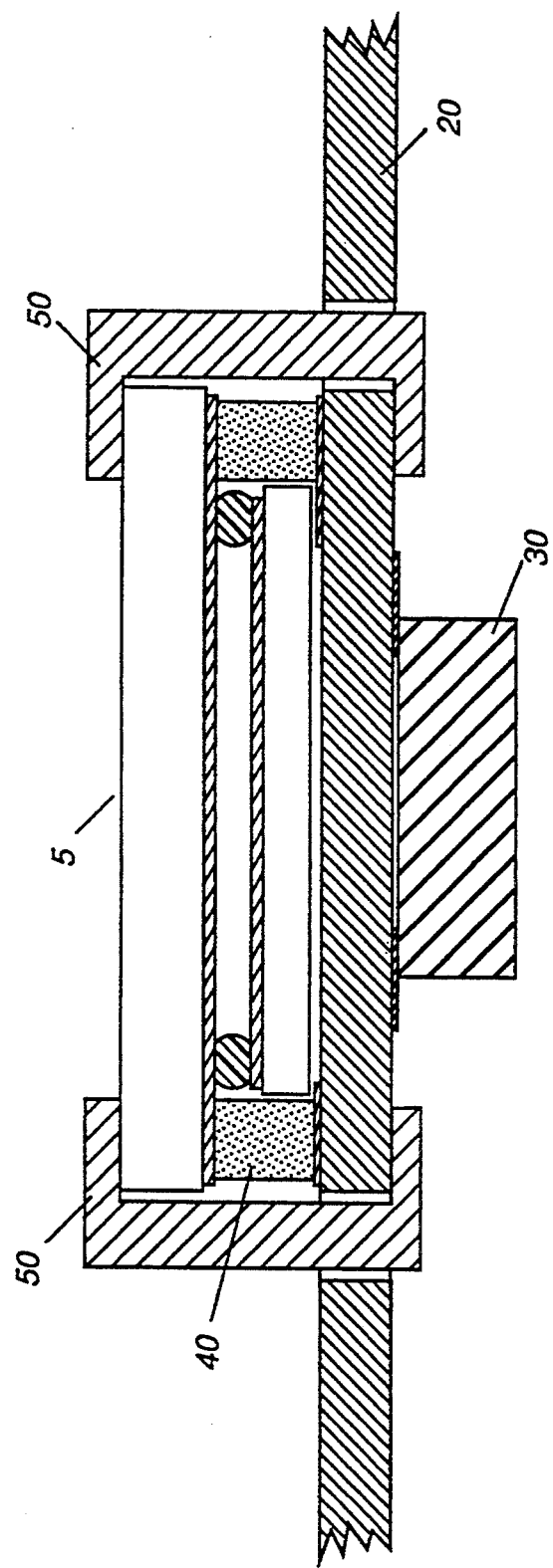
FIG. 1 is a cross-sectional view of a conventional liquid crystal display module in accordance with the prior art.
Figure 2:
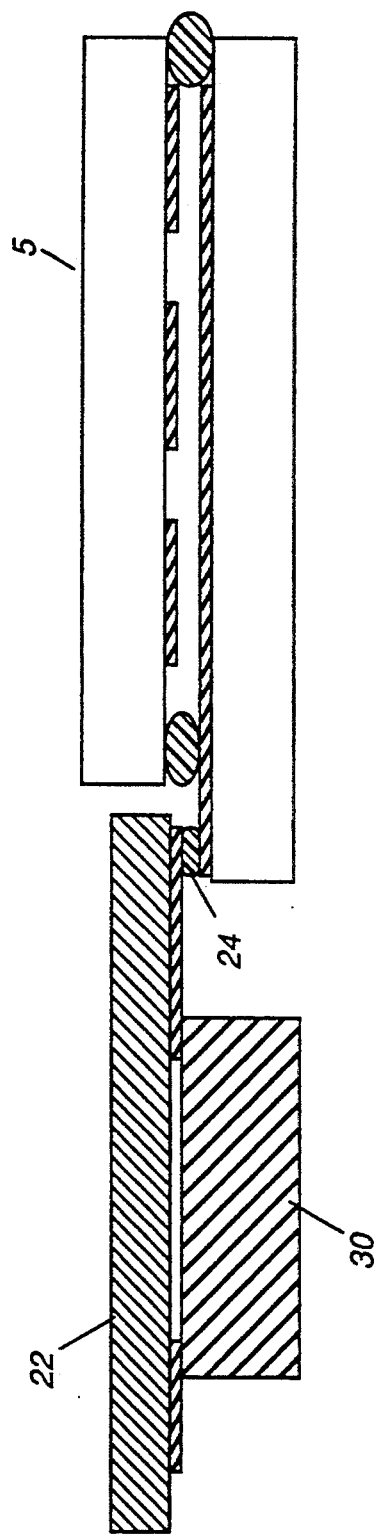
FIG. 2 is a cross-sectional view of another embodiment of the prior art.

While the specification concludes with claims defining the features of the invention that are regarded as novel, it is believed that the invention will be better understood from a consideration of the following description in conjunction with the drawing figures, in which like reference numerals are carried forward. The relative sizes of the various elements shown in the drawings has, in some cases, been exaggerated to aid the reader in understanding the invention and to add clarity to the figures.

Figure 4:
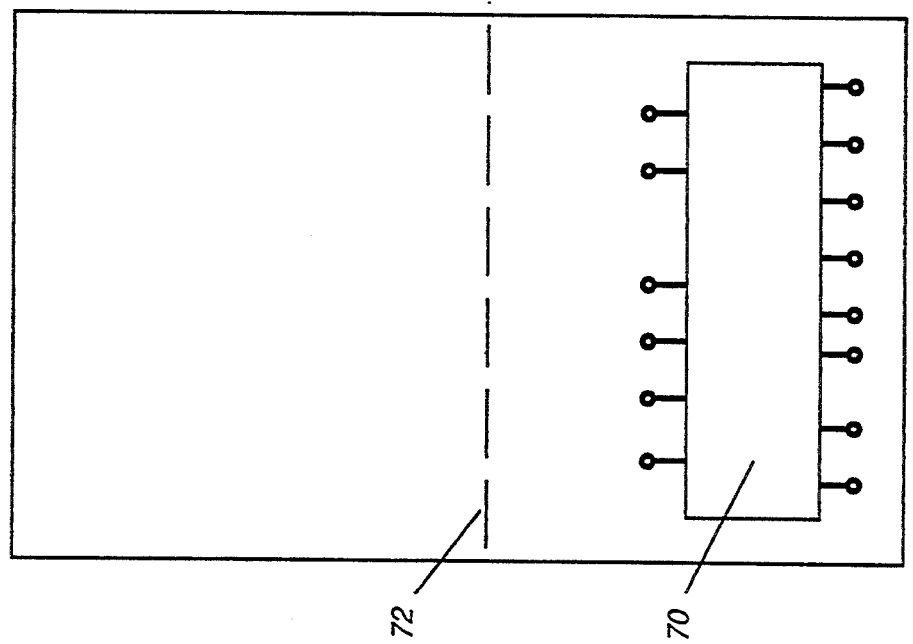
FIG. 4 is a plan view of the bottom side of the flexible substrate shown in FIG. 3.
Figure 3:
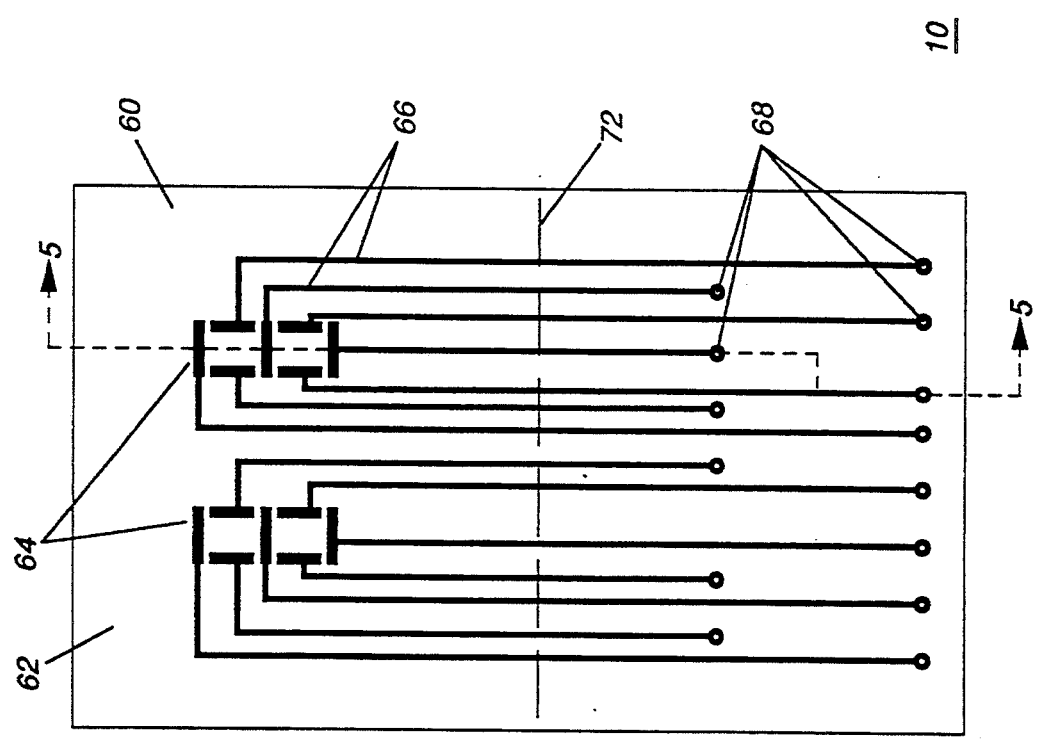
FIG. 3 is a plan view of the top side of a flexible substrate in accordance with the present invention.

Referring now to FIG. 3, a liquid crystal display (LCD) package 10 is formed by creating a circuitry pattern 62 on a flexible substrate 60. The flexible substrate is typically thin plastic material, for example, polyesters. The circuitry pattern 62 consists of several portions, a first portion being the electrode segments 64. These segments make up the features that are to be shown in the finished display. FIG. 3 shows a typical seven segment element that is used in numeric displays. Each segment of the electrode 64 has an accompanying conductive runner 66 that connects the electrodes to a driver circuit. The conductive runners 66 are also connected to conductive vias or plated through holes 68. These conductive vias are formed in a conventional manner through the substrate, for example, by drilling, etching, stamping, lasing, etc. The purpose of the conductive vias 68 is to connect the electrode segments 64 to the display driver 70 on the flexible substrate 60. FIG. 4 shows the backside of the substrate 60 and one type of connecting methodology whereby the display driver 70 can be connected to the conductive runners 66 by means of the conductive vias 68.

The electrode 64 and the conductive runners 66 are formed by depositing, for example, using sputtering, a layer of indium/tin oxide (ITO) on the substrate and delineating it using conventional photolithography. The conductive runners 66 are further sputtered or plated with a subsequent layer of copper in order to create a more robust line to allow folding in later operations. The dashed line 72 in FIGS. 3 and 4 shows an area where the display may be folded. Portions of the conductive runner 66 in this area are metallized with the copper overlayer. Other metallization systems, for example, aluminum, nickel, tin, gold, platinum, and so on, may be used to similarly add mechanical strength to the conductive runners.

Figure 5:
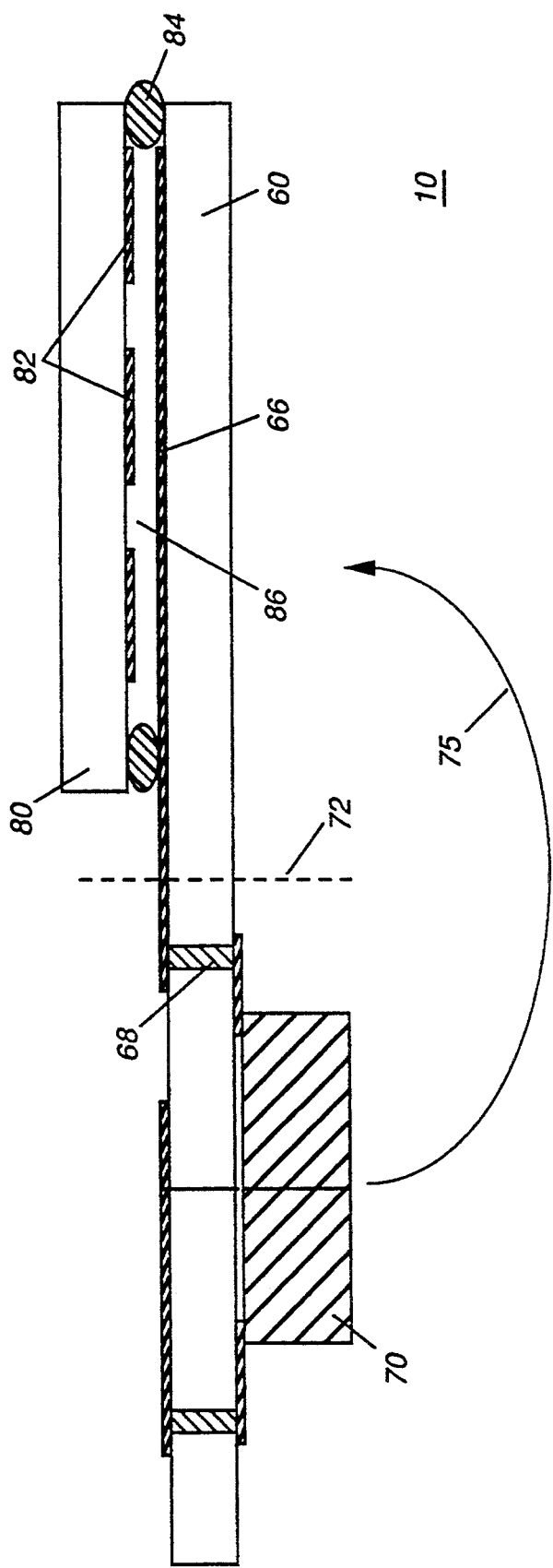
FIG. 5 is a cross-sectional view through section 5—5 of FIG. 3.

Referring now to FIG. 5, a top substrate 80 contains a top electrode 82 also formed in a conventional manner. The top substrate 80 may be a rigid substrate, such as glass, which is normally used in conventional liquid crystals displays, or it may also be a flexible plastic material similar to the flexible substrate 60 used for the bottom. The top substrate 80 is bonded to the flexible substrate 60 using a sealing means 84 around the perimeter of the substrate. Sealing means 84 is typically an epoxy or other type of adhesive used to hold the two substrates together and also to seal in the liquid crystal material 86. As can seen from FIG. 5, the top substrate 80 and the bottom substrate 60 are arranged in a mutually opposing planar relationship normally found in LCD structures. Additional elements, such as spacers between the two substrates, may be employed in order to maintain the gap between the substrates as one skilled in the art will readily appreciate. It should be noted that the top substrate 80 only covers a portion of the bottom substrate 60, that portion being represented by the upper half of the figure above the dashed line 72 in FIG. 3. This is referred to as the display area of the LCD package 10. Note that the conductive runners 66 are connected to the conductive vias 68 and further to the display driver 70. In this embodiment of the invention, the display driver 70 is on the back side of the flexible substrate 60 or opposite the display area. The display driver 70 is attached to the conductive runners by any of a number of conventional means, such as low-temperature solder, conductive epoxy, and other conductive media.

Figure 6:
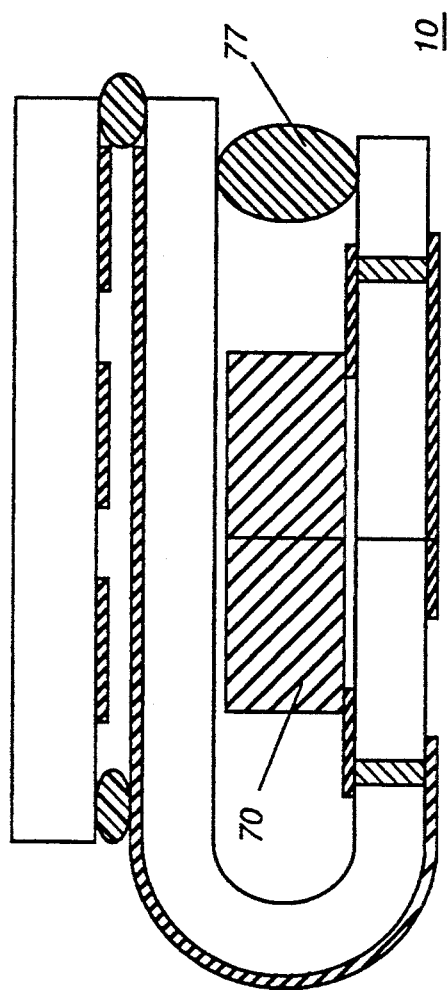
FIG. 6 is a view of the module shown in FIG. 5 after folding 180°.
Figure 7:
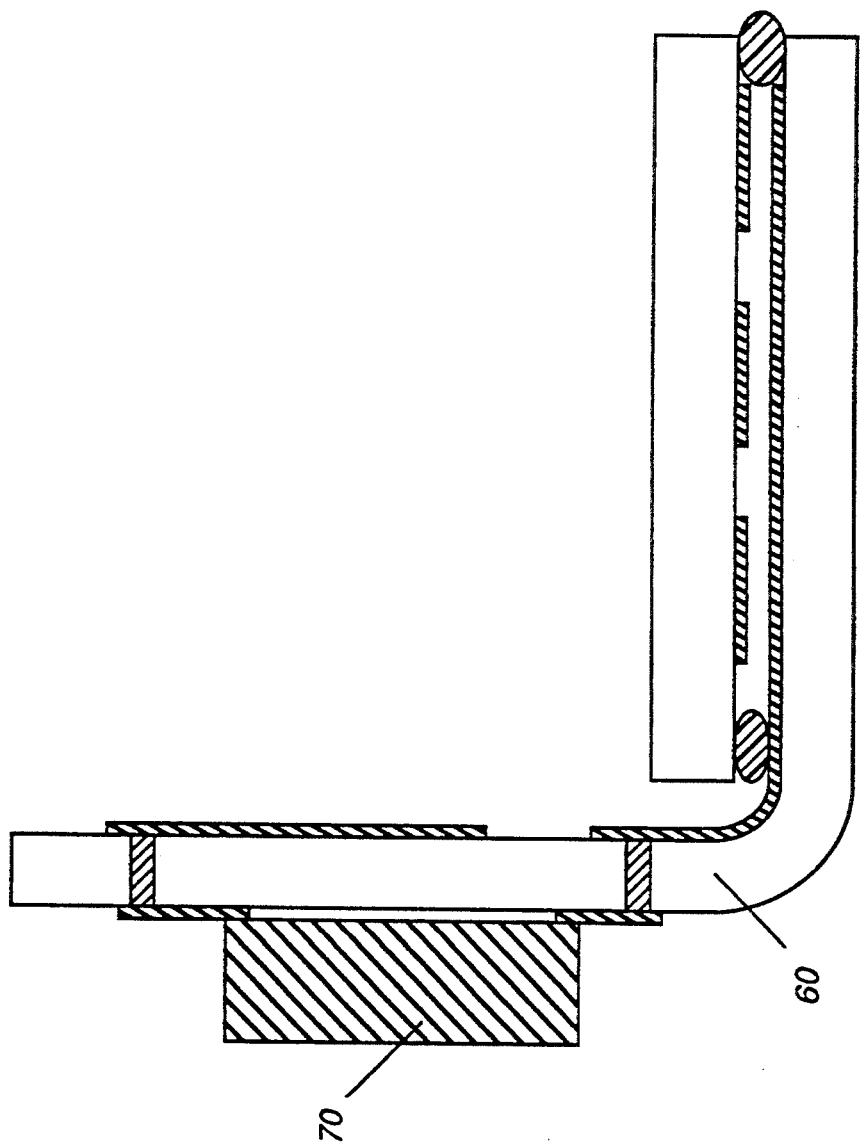
FIGS. 7 and 8 are cross-sectional view of alternate embodiments of the invention.
Figure 8:
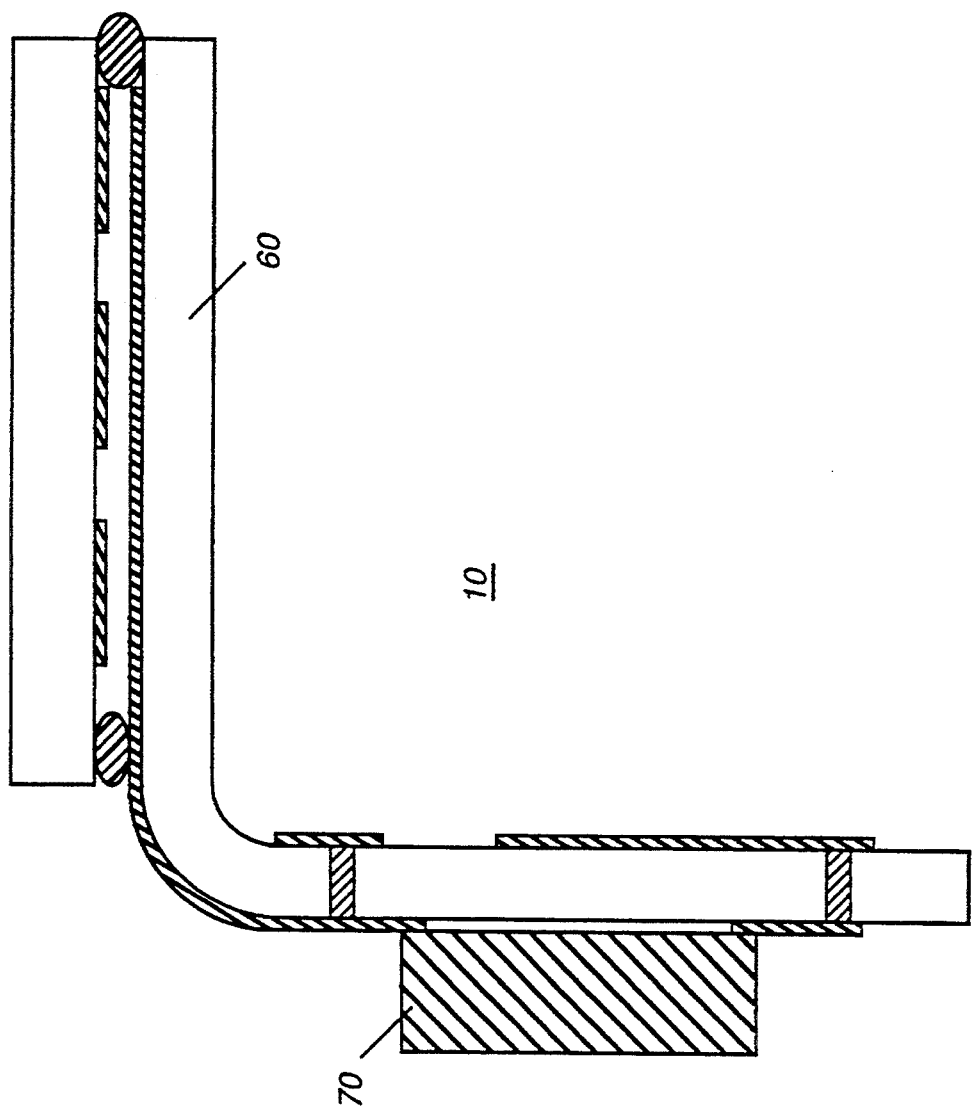

After the LCD is assembled, it is folded about the dashed line 72 as shown by the arrow 75. After folding, the display driver 70 now resides directly underneath the display area of the LCD package. As shown in FIG. 6, the folded substrate is retained in the folded position by a bonding agent 77, such as an adhesive, an epoxy, by hot-melt material, or other types of retaining or bonding materials. FIG. 7 shows an alternate embodiment of the invention wherein the fold is made in an opposite direction and only in an approximate 90° bend. FIG. 8 shows a further embodiment of the invention wherein the display driver 70 is mounted on the same side of the flexible substrate 60 as the display electrode. In this situation, the package can be folded 90° as shown, or folded another 90° to make the display driver 70 lie directly below the display area but on an opposite side. This configuration would be similar to that shown in FIG. 6, but the display driver 70 would now be on the exterior of the package rather than the interior. Again, a bonding agent might be employed in order to retain the flexible substrate in the "folded position." The drawing figures show but a few embodiments of the invention and it would be clear to one skilled in the art that other configurations and folding schemes might be envisioned as required by the design of the particular LCD package. For example, multiple folds might be made in the flexible substrate, or the flexible substrate might be bent through other angles, such as 45°, 30°, etc., in order to create other package configurations. However, it should be clear to the reader that the instant invention provides one with numerous options of folding and packaging an LCD package that provides a display driver circuit on the same substrate as the LCD and also provides a much smaller, lighter and more compact package.

In summary, the instant invention utilizes the flexible properties of a plastic substrate and a flexible metallization system integrated into one piece which forms the substrate of the liquid crystal display. The display section of the substrate provides some of the needed rigidity to the LCD. The addition of the flexible metal system to the flexible substrate provides a unique and novel package to attach the driver circuitry to the display without the need for additional flex circuits, interconnects, and substrates as normally found in the conventional art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A liquid crystal display device, comprising:
 a first flexible substrate having first and second opposing sides and conductive vias therethrough;
 a film electrode disposed on the first side and connected to the conductive vias by conductive runners;
 a circuitry pattern disposed on the second side and connected to the film electrode by the conductive vias;
 a second substrate having an electrode disposed thereon, the first and second substrates arranged in a mutually opposing planar relationship for forming a liquid crystal display device;
 a liquid crystal material disposed between the first and second substrates;
 a display driver attached to the circuitry pattern on the second side of the flexible substrate and
 the flexible substrate is folded 180° so that the display driver is directly below the film electrode.

2. The liquid crystal display device as described in claim 1, further comprising a bonding agent to maintain the flexible substrate in the folded position.

3. A liquid crystal display device, comprising:
 a first flexible substrate having first and second opposing sides and conductive vias therethrough;
 a film electrode disposed on the first side and connected to the conductive vias by conductive runners;
 a circuitry pattern disposed on the second side and connected to the film electrode by the conductive vias;
 a second substrate having an electrode disposed thereon, the first and second substrates arranged in a mutually opposing planar relationship for forming a liquid crystal display device;
 a liquid crystal material disposed between the first and second substrates;
 a display driver attached to the circuitry pattern on the second side of the flexible substrate and
 the flexible substrate is folded 90°.

4. A liquid crystal display device, comprising:
 a first flexible polyester substrate having first and second opposing sides and conductive vias therethrough;

an indium-tin oxide electrode disposed on the substrate first side and connected to the conductive vias by conductive runners comprising a layer of copper superimposed upon a layer of indium-tin oxide;

an indium-tin oxide circuitry pattern disposed on the substrate second side and connected to the electrode by the conductive vias;

a second substrate having an indium-tin oxide electrode disposed thereon, the first and second substrates arranged in a mutually opposing planar relationship for forming a liquid crystal display device;

a liquid crystal material disposed between the first and second substrates;

a display driver attached to thee circuitry pattern on the second side of the flexible substrate;

the flexible substrate folded 180° so that the display driver is directly below the indium-tin oxide electrode; and a bonding agent to maintain the flexible substrate in the folded position.

* * * * *